US007294950B2

(12) United States Patent
Yoshida

(10) Patent No.: US 7,294,950 B2
(45) Date of Patent: Nov. 13, 2007

(54) ELECTROSTATIC ACTUATOR, ELECTROSTATIC ACTUATOR DRIVING METHOD ELECTROMECHANICAL TRANSDUCER, AND ELECTROMECHANICAL TRANSDUCER DRIVING METHOD

(75) Inventor: Mitsunobu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 10/950,421

(22) Filed: Sep. 28, 2004

(65) Prior Publication Data

US 2005/0102045 A1  May 12, 2005

(30) Foreign Application Priority Data

Sep. 30, 2003  (JP)  ............... 2003-342228

(51) Int. Cl.
H02N 1/00 (2006.01)
G02B 7/04 (2006.01)
(52) U.S. Cl. ........................... 310/309; 396/80
(58) Field of Classification Search ................ 310/309, 310/317; 318/116; 700/60–62, 75; 396/77–82
See application file for complete search history.

(56) References Cited

U.S. PATENT DOCUMENTS

| | | | | |
|---|---|---|---|---|
| 5,196,963 A | * | 3/1993 | Sato et al. ................... 359/699 |
| 5,515,129 A | * | 5/1996 | Miyazawa et al. ............ 396/79 |
| 6,531,804 B2 | * | 3/2003 | Kasahara .................... 310/309 |
| 6,611,079 B2 | * | 8/2003 | Koga et al. .................. 310/309 |
| 6,661,585 B2 | * | 12/2003 | Okawara .................... 359/697 |
| 6,670,738 B2 | | 12/2003 | Kasahara et al. |
| 6,680,558 B2 | | 1/2004 | Akiba et al. |
| 6,713,939 B2 | * | 3/2004 | Kasahara .................... 310/309 |
| 6,717,326 B2 | * | 4/2004 | Koga et al. .................. 310/309 |
| 6,750,591 B2 | * | 6/2004 | Akiba et al. ................. 310/309 |
| 6,765,332 B2 | * | 7/2004 | Akiba ......................... 310/309 |
| 6,774,534 B2 | * | 8/2004 | Akiba et al. ................. 310/309 |

(Continued)

FOREIGN PATENT DOCUMENTS

JP   63-302774   9/1988

(Continued)

OTHER PUBLICATIONS

Akihiro Koga, et al., "Electrostatic Linear Microactuator Mechanism for Focusing a CCD Camera", Journal of Lightwave Technology by IEEE, vol. 17, No. 1, Jan. 1999, 10 Pages.

*Primary Examiner*—Karl Tamai
(74) *Attorney, Agent, or Firm*—Oblon, Spivak, McClelland, Maier & Neustadt, P.C.

(57) ABSTRACT

An electrostatic actuator includes a stator having an electrode substrate, a movable unit having a movable element and an electrode arranged opposite to the electrode substrate, a plurality of first operation modules each of which issues an operation command for realizing a first operation, a plurality of second operation modules each of which issues an operation command for realizing a second operation, a module selector which selectively enables one first operation module of the first operation modules and selectively enables one second operation module of the second operation modules, an actuator drive module which generates a waveform signal on the basis of the operation command from the enabled first operation module and the operation command from the enabled second operation module and a switching circuit which converts the waveform signal into a voltage to apply the voltage to the electrode substrate.

6 Claims, 9 Drawing Sheets

U.S. PATENT DOCUMENTS

| | | |
|---|---|---|
| 6,781,281 B2 | 8/2004 | Koga et al. |
| 6,784,594 B2 * | 8/2004 | Kasahara et al. ............ 310/309 |
| 6,806,618 B2 * | 10/2004 | Koga et al. ................. 310/309 |
| 6,806,661 B2 * | 10/2004 | Kasahara et al. ........... 318/116 |
| 6,829,433 B2 * | 12/2004 | Kasahara ..................... 396/75 |
| 6,853,501 B2 * | 2/2005 | Mukaiya ..................... 359/698 |
| 6,900,576 B2 * | 5/2005 | Koga et al. ................. 310/309 |
| 6,924,940 B2 * | 8/2005 | Koga et al. ................. 359/694 |
| 7,091,648 B2 * | 8/2006 | Gondoh ...................... 310/309 |
| 7,095,565 B2 * | 8/2006 | Koga et al. ................. 359/694 |
| 2004/0119870 A1 * | 6/2004 | Yoshida et al. ............. 348/335 |
| 2004/0130639 A1 * | 7/2004 | Koga et al. ................. 348/294 |
| 2005/0102045 A1 * | 5/2005 | Yoshida ........................ 700/61 |
| 2005/0104473 A1 * | 5/2005 | Yoshida ...................... 310/309 |
| 2005/0218940 A1 * | 10/2005 | Yoshida ...................... 327/106 |
| 2005/0225179 A1 * | 10/2005 | Yoshida ...................... 307/143 |
| 2005/0253481 A1 * | 11/2005 | Koga et al. ................. 310/309 |

FOREIGN PATENT DOCUMENTS

JP            10-239578     *    9/1998

* cited by examiner

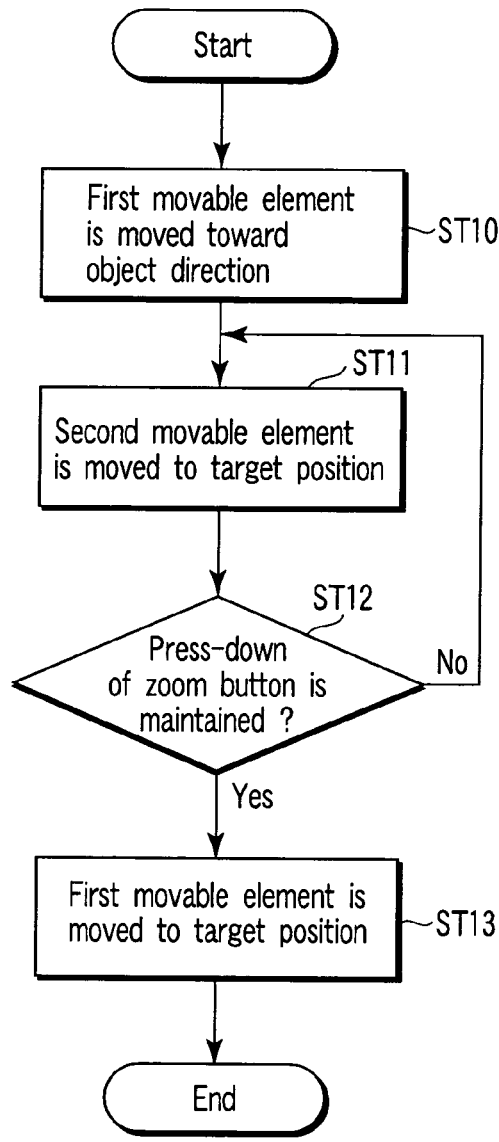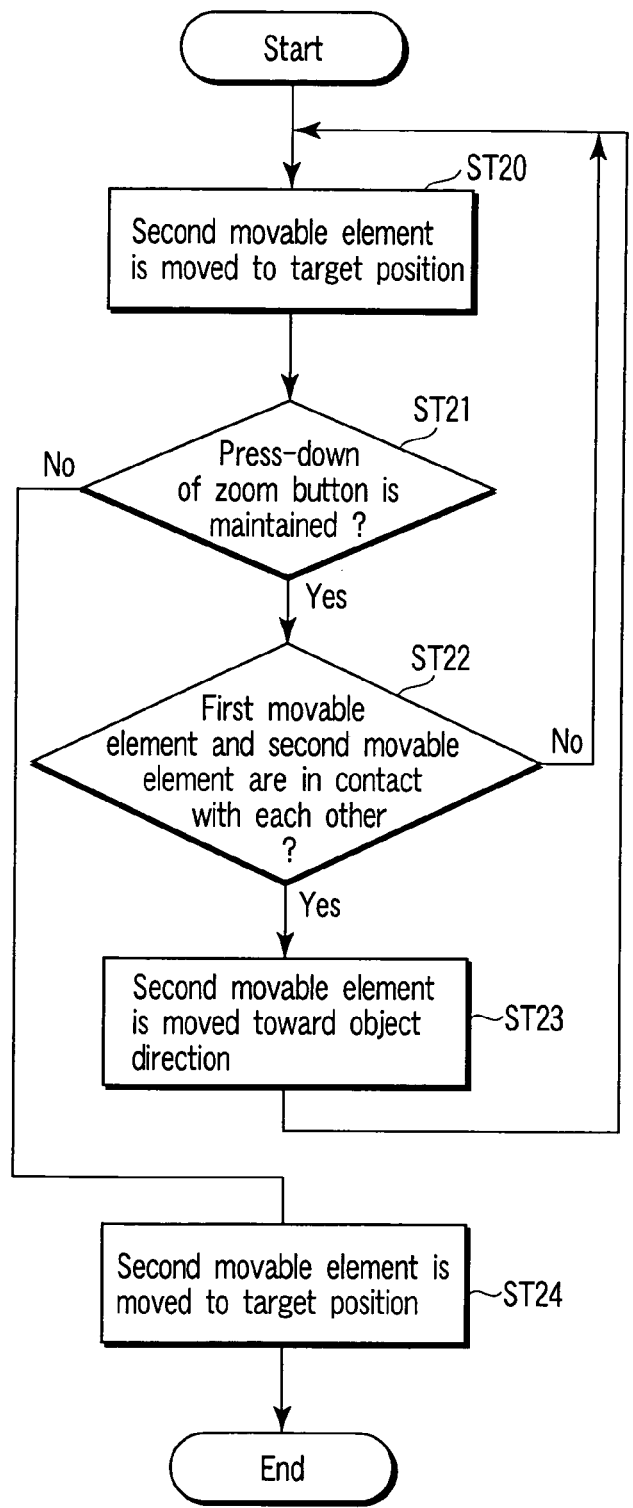
FIG. 2A
FIG. 2B

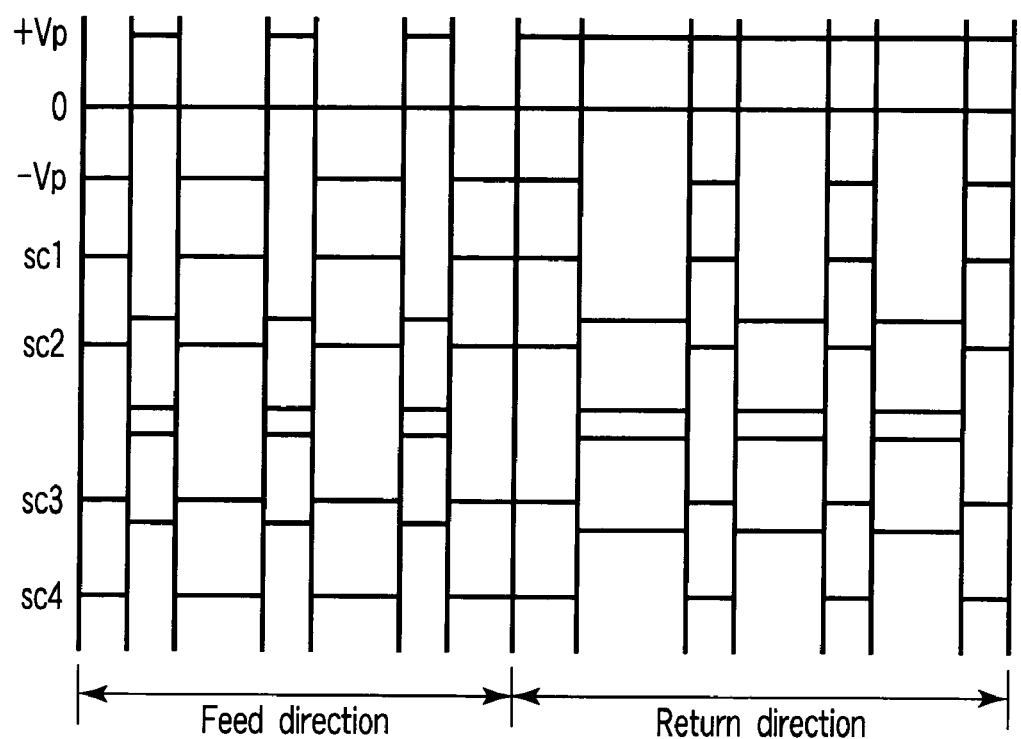
F I G. 14
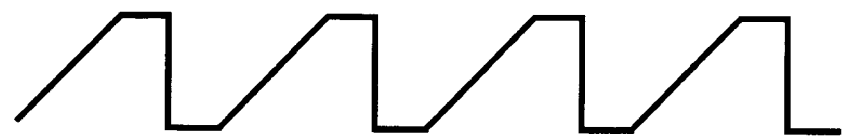
F I G. 15A
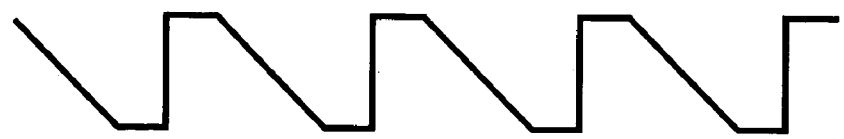
F I G. 15B

ELECTROSTATIC ACTUATOR, ELECTROSTATIC ACTUATOR DRIVING METHOD ELECTROMECHANICAL TRANSDUCER, AND ELECTROMECHANICAL TRANSDUCER DRIVING METHOD

CROSS-REFERENCE TO RELATED APPLICATIONS

This application is based upon and claims the benefit of priority from prior Japanese Patent Application No. 2003-342228, filed Sep. 30, 2003, the entire contents of which are incorporated herein by reference.

BACKGROUND OF THE INVENTION

1. Field of the Invention

The present invention relates to an electromechanical transducer which generates mechanical drive force by applying voltage and an electromechanical transducer driving method, for example, to an electrostatic actuator which is driven by electrostatic force and an electrostatic actuator driving method.

2. Description of the Related Art

Recently the electrostatic actuator is often used in order to drive a lens mounted on a digital camera, a cellular phone, and the like to perform zooming operation or autofocus operation (Jpn. Pat. Appln. KOKAI Publication Nos. 6-277894 and 9-46654). In an actuator control unit in which such an electrostatic actuator is operated, a dedicated operation module for each type of device in which an operation sequence is stored is previously incorporated, the lens is driven in accordance with the previously stored operation sequence on the basis of an external signal generated by the zooming operation of a user or the like.

In addition to the electrostatic actuator, the electromechanical transducer such as a piezoelectric actuator is well known as the device which generates the mechanical drive force by applying the voltage (Jpn. Pat. Appln. KOKAI Publication Nos. 2001-119917 and 2002-27767).

There is the following problem in the electrostatic actuator and the electrostatic actuator driving method. Namely, since the dedicated operation module is produced for each type of device, production cost per one electrostatic actuator is increased, which eventually increases the production cost of the portable devices such as the cellular phone and the digital camera into which the electrostatic actuator is incorporated.

BRIEF SUMMARY OF THE INVENTION

In view of the foregoing, it is an object of the invention to provide the electrostatic actuator and the electrostatic actuator driving method which can reduce the production cost.

In an electrostatic actuator of the invention comprising, a stator having an electrode substrate, a movable unit having at least one movable element and guided by the stator to be freely reciprocated in a predetermined direction, an electrode arranged opposite to the electrode substrate, a plurality of first operation modules each of which issues an operation command for realizing a first operation, a plurality of second operation modules each of which issues an operation command for realizing a second operation, a module selector which selectively enables one first operation module of the first operation modules and selectively enables one second operation module of the second operation modules, an actuator drive module which generates a waveform signal on the basis of the operation command from the enabled first operation module and the operation command from the enabled second operation module and a switching circuit which converts the waveform signal into a voltage to apply the voltage to the electrode substrate.

BRIEF DESCRIPTION OF THE SEVERAL VIEWS OF THE DRAWING

FIGS. 2A and 2B show example of a control flow in the electrostatic actuator;

FIG. 14 is an explanatory view showing control signals outputted from a control circuit for controlling a drive circuit, which is incorporated into the piezoelectric actuator, and applied to each switching element; and FIGS. 15A and 15B are an explanatory view showing a waveform of drive voltage applied to an electromechanical transducer incorporated into the piezoelectric actuator.

DETAILED DESCRIPTION OF THE INVENTION

Figure 1:
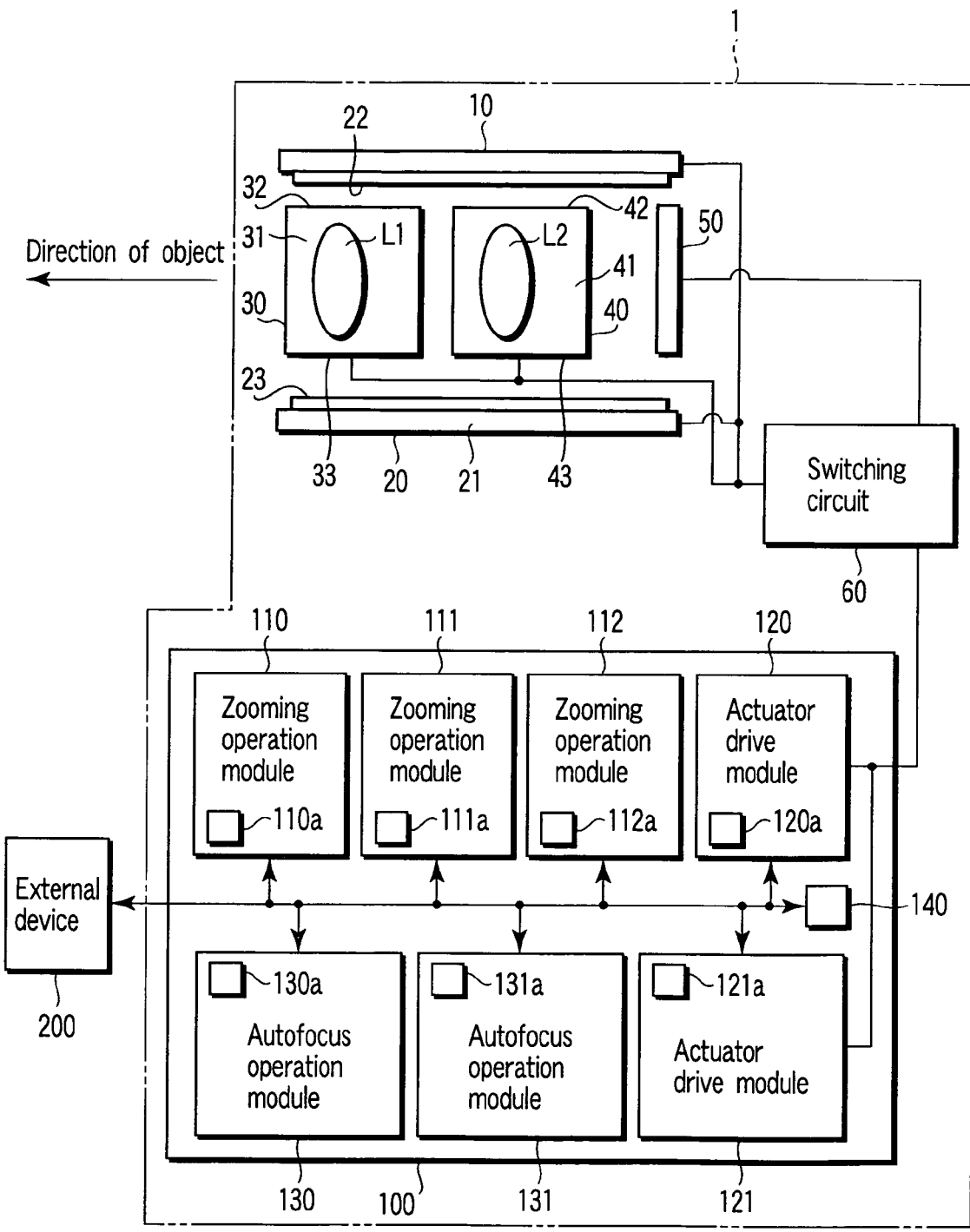
FIG. 1 shows a schematic configuration of an electrostatic actuator according to a first embodiment of the invention.

FIG. 1 shows a schematic configuration of an electrostatic actuator 1 according to a first embodiment of the invention. A camera module incorporated into a miniature electronic device or the like is formed by the electrostatic actuator 1.

The electrostatic actuator 1 includes an actuator 10, a switching circuit 60 which applies the voltage to each electrode of the actuator 10, and an actuator control unit 100 which controls the actuator 10 and the switching circuit 60. The reference numeral 200 in FIG. 1 represents an external device such as a zoom button and a focus sensor, and the external device 200 has a function of transmitting a control switching parameter to the actuator control unit 100.

The electrostatic actuator 10 includes a stator 20 formed in a substantially rectangular solid having a hollow portion, a first movable element 30 and a second movable element 40 which are arranged to be freely reciprocated in an axial direction of the hollow portion of the stator 20, and an image pickup device 50 imaged by lenses L1 and L2 which will be mentioned later.

A stator frame 21 and electrode substrates 22 and 23 are formed in the stator 20. The electrode substrates 22 and 23 are attached to surfaces opposite to electrode planes 32, 33, 42 and 43. In the electrode substrates 22 and 23, stripe-shaped electrodes are formed in the electrode planes opposite to the first movable element 30 and the second movable element 40.

The first movable element 30 holds the lens L1 and includes a movable element main body 31 formed in the shape of the substantially rectangular solid. A pair of electrode planes 32 and 33 is formed in the movable element main body 31. The pair of electrode planes 32 and 33 is located opposite to the electrode substrates 22 and 23 of the stator 20, and a convex stripe electrode is formed in the pair of electrode planes 32 and 33 respectively.

The second movable element 40 holds the lens L2 and includes a movable element main body 41 formed in the shape of the substantially rectangular solid. A pair of electrode planes 42 and 43 is formed in the movable element main body 41. The pair of electrode planes 42 and 43 is located opposite to the electrode substrates 22 and 23 of the stator 20, and the convex stripe electrode is formed in the pair of electrode planes 42 and 43 respectively.

The switching circuit 60 has the function of converting the inputted waveform data into the voltage applied to the electrode substrates 22, 23, 32, 33, 42 and 43. Namely, 1/0 of each bit of the waveform data corresponds to High/Low of the voltage provided to the electrodes.

The actuator control unit 100 includes first to third zooming operation modules (first operation module) 110 to 112, first and second actuator operation modules 120 and 121, first and second autofocus operation modules (second operation module) 130 and 131, and a startup flag register 140. Flag registers (module selection units) 110a to 112a, 120a, 121a, 130a and 131a for selecting valid/invalid of the module are provided in the modules 110 to 112, 120, 121, 130 and 131, respectively.

The modules 110 to 112, 120, 121, 130 and 131 perform a predetermined process only when the flag registers 110a to 112a, 120a, 121a, 130a and 131a become valid respectively. The modules 110 to 112, 120, 121, 130 and 131 monitor the startup flag register 140. The modules 110 to 112, 120, 121, 130 and 131 can be operated only when the startup flag register 140 is turned ON.

The first to third zooming operation modules 110 to 112 hold a zoom curve therein. While a zoom command is issued as the control switching parameter form the external device 200, the first to third zooming operation modules 110 to 112 have the function of directing the drive direction and the amount of drive of the actuator 10 to the actuator drive modules 120 and 121 so that the actuator 10 traces a specific position.

The zooming operation modules 110 to 112 have different algorithms. For example, FIG. 2A shows a control flow in which a drive sequence can be easily performed in the case where blurring of the zoom is large, and FIG. 2B shows a control flow in which the blurring of the zoom can be suppressed to the minimum level though the drive sequence becomes complicated.

In the control flow shown in FIG. 2A, the first movable element 30 is moved to the object direction (ST10), and the second movable element 40 is moved to a target position (ST11). Then, it is decided whether the zoom button (external device 200) is maintained at a press-down position or not (ST12). When the zoom button is maintained at the press-down position, the movement of the second movable element 40 is maintained. When the press-down of the zoom button is finished, the first movable element 30 is moved to the target position (ST13), and the control flow is ended.

In the control flow shown in FIG. 2B, after the second movable element 40 is moved to the target position (ST20), it is decided whether the zoom button is maintained at a press-down position or not (ST21). When the zoom button is maintained at the press-down position, it is decided whether the first movable element 30 and the second movable element 40 are in contact with each other or not (ST22). When the first movable element 30 and the second movable element 40 are in contact with each other, the second movable element 40 is moved toward the object direction (ST23), and the control flow returns to ST20. When the first movable element 30 and the second movable element 40 are not in contact with each other, the control flow directly returns to ST20.

On the other hand, when the zoom button is not maintained at the press-down position in ST21, the second movable element 40 is moved to the target position (ST24), and the control flow is ended.

The first and second actuator drive modules 120 and 121 have the function of generating the waveform data in accordance with the drive direction and the amount of drive directed by the first to third zooming operation modules 110 to 112 and outputting the same to the switching circuit 60.

During the time when an autofocus command is issued as the control switching parameter from the external device 200, the first and second autofocus operation modules 130 and 131 have the function of directing the drive direction and the amount of drive of the actuator 10 to the actuator drive modules 120 and 121 so that contrast of luminance of the sensor become the maximum, while the first and second autofocus operation modules 130 and 131 obtains sensor information from the image pickup device 50.

Figure 3:
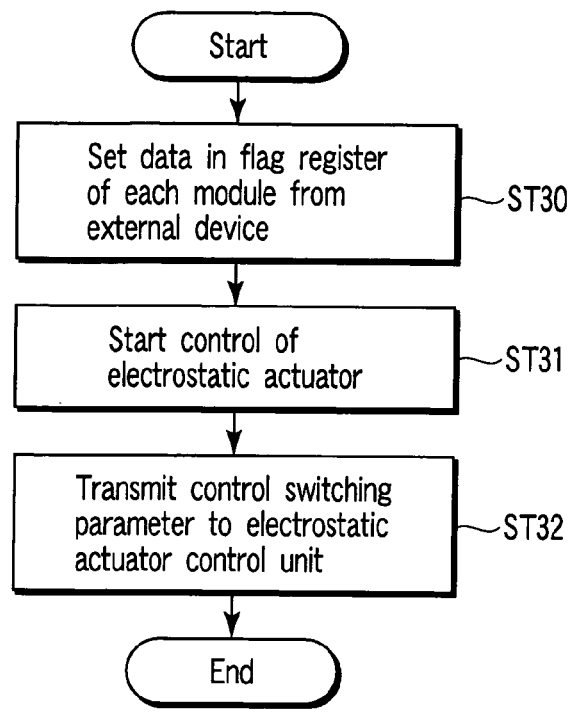
FIG. 3 shows an example of a control flow in the electrostatic actuator.

The electrostatic actuator 1 having the above-described configuration is operated as below. Two examples of the operation will be described here. FIG. 3 shows the control flow in the first operation example. In the flag registers 110a to 112a of the first to third zooming operation modules 110 to 112, the flag registers 120a and 121a of the first and second actuator drive modules 120 and 121, and the flag registers 130a and 131a of the first and second autofocus operation modules 130 and 131, each one of the flag registers surely becomes valid in the initial state.

The external device 200 transmits a signal for turning each flag register ON/OFF (ST30). The actuator control unit 100 determines which flag register is enabled from the lens configuration and the like of the actuator 10 to select the optimum zooming operation and autofocus drive operation. When the optimum algorithm is equal to the initial state, Step ST30 can be neglected.

Then, the startup flag register 140 is set to ON in order to start the actuator control (ST31).

The external device 200 transmits the control switching parameter to the actuator control unit 100 at the same time when the operation of the electrostatic actuator 1 is started, and the actuator control unit 100 reads the value of the control switching parameter to perform the specific operation (ST32).

Figure 4:
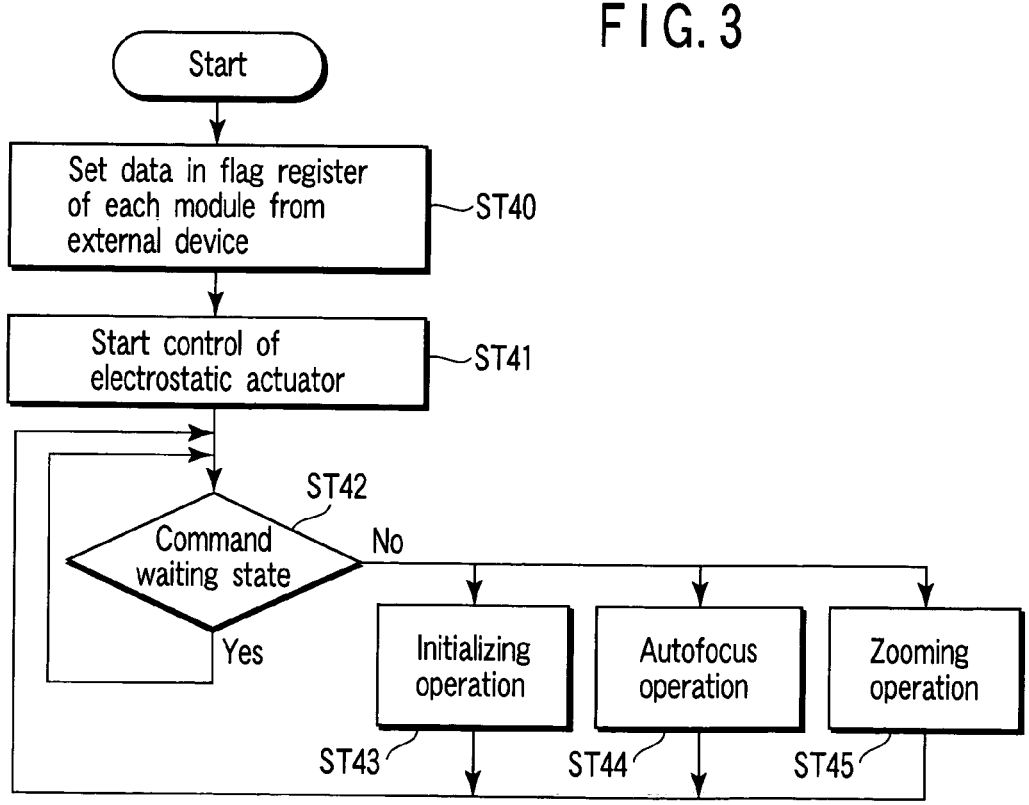
FIG. 4 shows an example of a control flow in the electrostatic actuator.

FIG. 4 shows the control flow in the second operation example. The initial state of the second operation example is similar to the first operation example described above. The external device 200 transmits a signal for turning each flag register ON/OFF (ST40). The actuator control unit 100 determines which flag register is enabled from the lens configuration and the like of the actuator 10 to select the optimum zooming operation and autofocus drive operation. When the optimum algorithm is equal to the initial state, Step ST30 can be neglected.

Then, the startup flag register 140 is set to ON in order to start the actuator control (ST41). When the startup flag register is turned ON, the control flow becomes a command waiting state in which an address 0x001 is monitored from the external device 200 to wait the input of the command information (ST42).

In the command waiting state, for example, the control program is operated as follows: When data 0x001 is written in the address 0x001, the actuator control unit 100 decides that the data 0x001 is the command of an initializing operation. When data 0x002 is written in the address 0x001, the actuator control unit 100 decides that the data 0x002 is the command of the autofocus operation. When data 0x003 is written in the address 0x001, the actuator control unit 100 decides that the data 0x003 is the command of the zooming operation. When the data except for the data 0x001 to the data 0x003 is written in the address 0x001, the command waiting state is maintained.

The specific operation, i.e. the initializing operation (ST43), the autofocus operation (ST44), or the zooming operation (ST45) is performed on the basis of each command from the external devices 200, and the control flow returns to the command waiting state.

As described above, in accordance with the electrostatic actuator 1 of the first embodiment, the desired algorithm can be selected by incorporating the plurality of operation modules into one chip and determining which module is enabled in accordance with the lens configuration of the actuator and the like. This enables the control compatible with the plurality of types of the electrostatic actuators to be performed only by manufacturing one type of the chip. Therefore, production cost of one chip can be decreased, and the electrostatic actuator and portable electronic devices such as a cellular phone and a digital camera into which the electrostatic actuator is incorporated can be manufactured at low cost.

Figure 5:
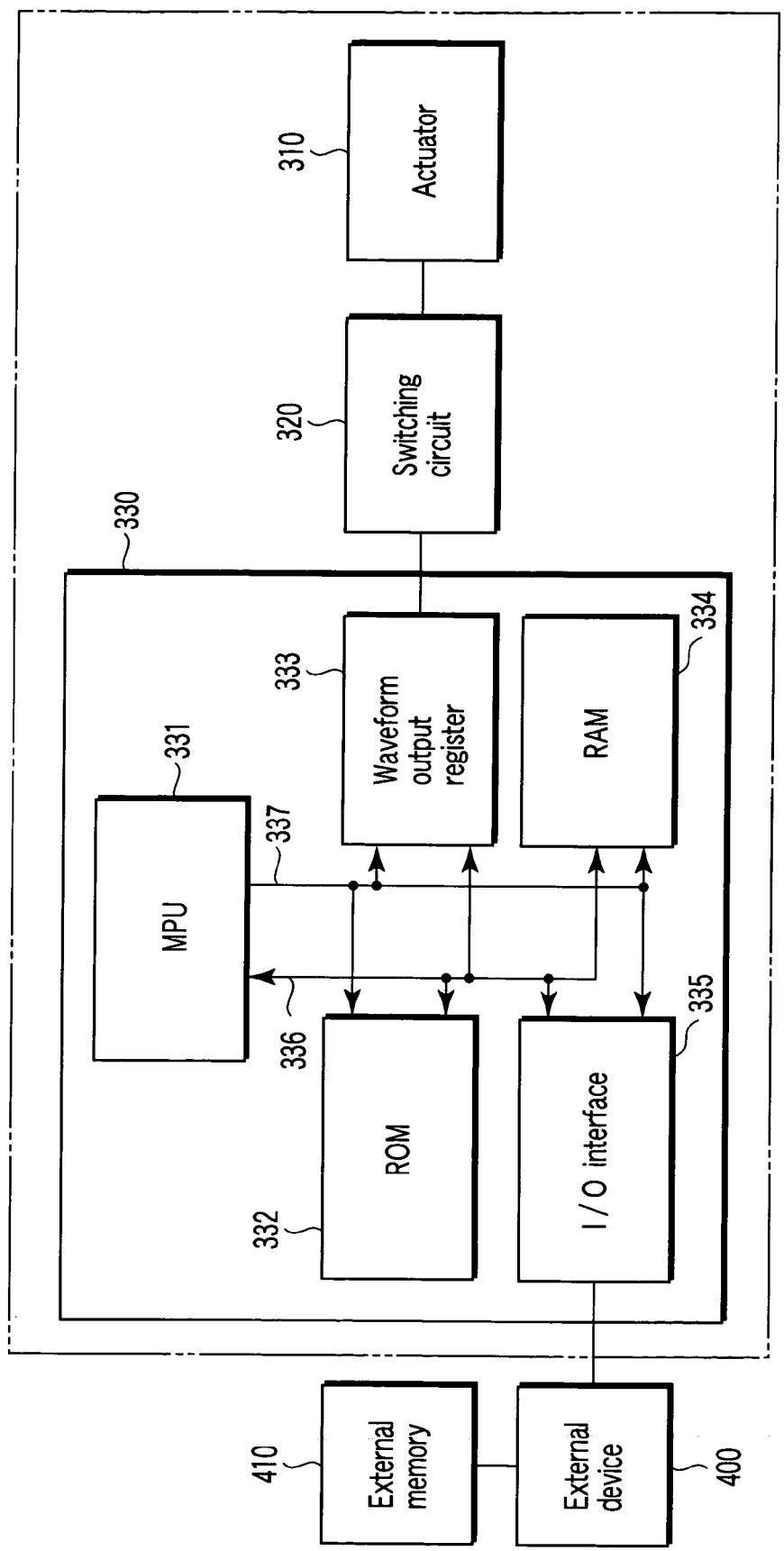
FIG. 5 shows a schematic configuration of an electrostatic actuator according to a second embodiment of the invention.

FIG. 5 shows a schematic configuration of an electrostatic actuator 300 according to a second embodiment of the invention.

The electrostatic actuator 300 includes an actuator 310, a switching circuit 320 which applies the voltage to each electrode of the actuator 310, and an actuator control unit 330 which controls the actuator 310 and the switching circuit 320. The reference numeral 400 in FIG. 5 represents an external device such as a zoom button and a focus sensor, and the external device 400 has a function of transmitting a control switching parameter to the actuator control unit 330. The reference numeral 410 represents an external memory, and the external memory 410 has the function of storing the control program to transmit the control program to the actuator control unit 330. The actuator control unit 330 and the external device 400 are connected to each other with a serial bus such as IIC bus.

The electrostatic actuator 310 includes a stator, a first movable element and a second movable element which are arranged to be freely reciprocated in the axial direction of the hollow portion of the stator, and an image pickup device imaged by the lenses L1 and L2 supported by the movable elements.

Because the configuration of the electrostatic actuator 310 is in the same way as those of the electrostatic actuator 10, portions which are common to the both are denoted by the same reference numerals, and descriptions thereof will be omitted.

The switching circuit 320 has the function of converting the inputted waveform data into the voltage applied to the electrode substrates 22 and 23. Namely, 1/0 of each bit of the waveform data corresponds to High/Low of the voltage provided to the electrodes.

The actuator control unit 330 includes an MPU 331, a ROM 332, a waveform output register 333 which outputs the waveform data to the switching circuit 320, a RAM 334 and an I/O interface 335, all of which are connected with a data bus 336 and an address bus 337.

The MPU 331 has the function of setting the appropriate drive waveform data and waveform time data into the waveform output register 333 from the ROM 332, in which a drive waveform data string and a waveform time data string are stored, on the basis of the current position of the actuator 310.

When the drive waveform data and waveform time data are set in the waveform output register 333, the waveform output register 333 outputs the drive waveform during the set waveform time.

The RAM 334 has the same function as the ROM 332, and the drive waveform data string and the waveform time data string can be rewritten from the outside in the RAM 334.

Figure 6:
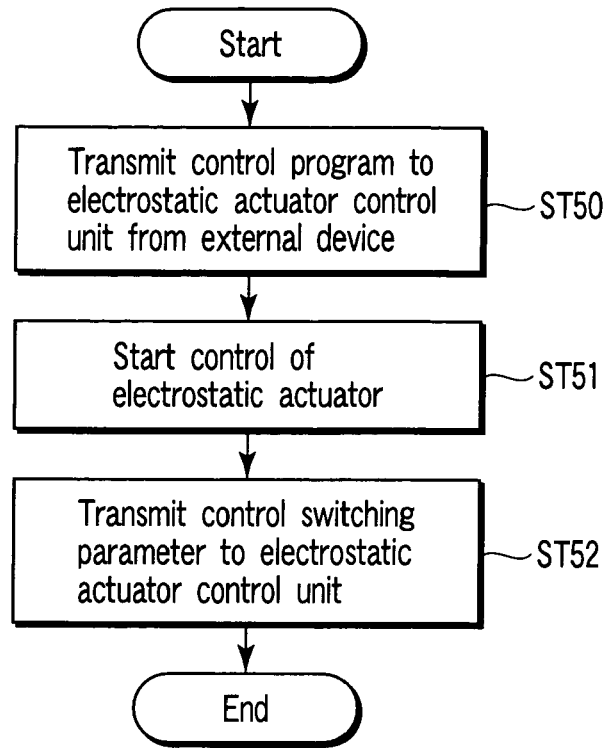
FIG. 6 shows an example of a control flow in the electrostatic actuator.
Figure 7:
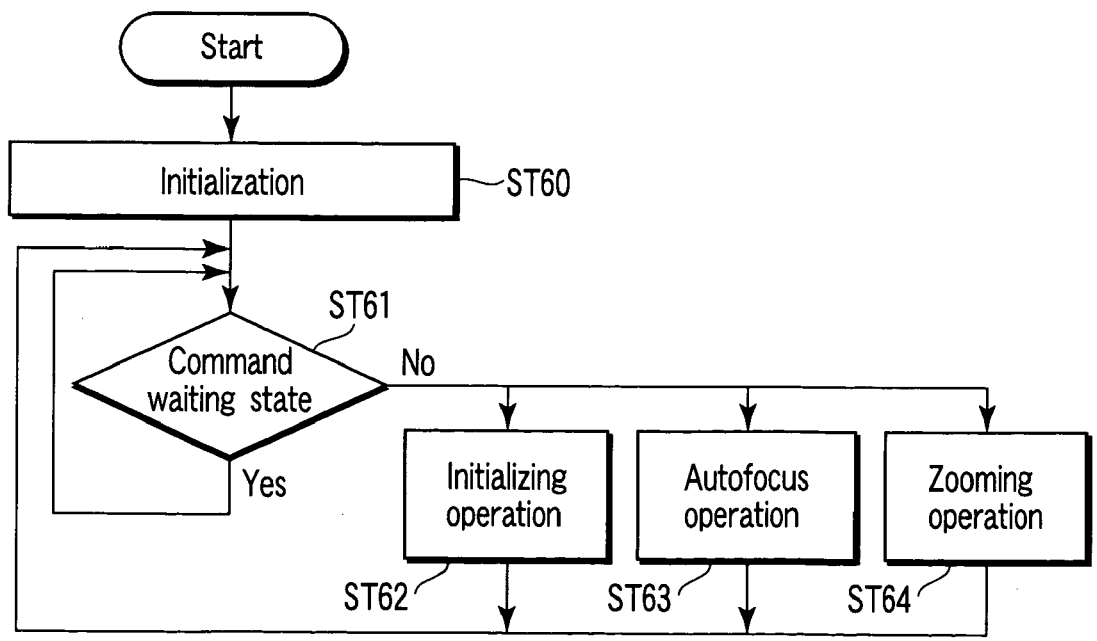
FIG. 7 shows an example of a control flow in the electrostatic actuator.

The electrostatic actuator 300 having the above-described configuration is operated as below. FIGS. 6 and 7 show the control flow in a first operation example. As shown in FIG. 6, the external memory 410 transmits the control program to the actuator control unit 330 (ST50), and the control program is stored in the RAM 334. Then, the control of the actuator 310 is started. When the external device 400 transmits the control switching parameter by the zooming operation or the like, the MPU 331 fetches the drive waveform data and waveform time data from the RAM 334 to set the drive waveform data string and the waveform time data string in the waveform output register 333.

As shown in FIG. 7, initialization is performed (ST60), and the control flow becomes a command waiting state (ST61). The operation according to the command is performed at the time when the command is inputted by the control switching parameter (ST62 to ST64).

Figure 8:
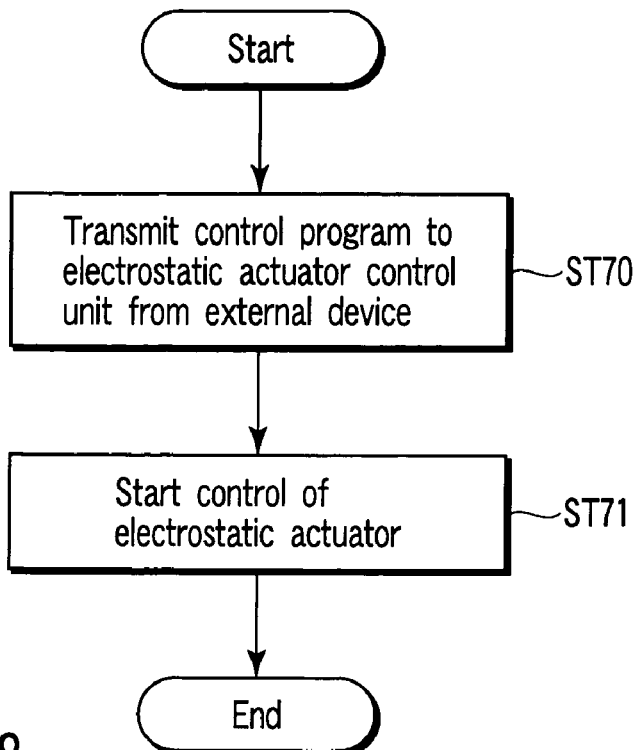
FIG. 8 shows an example of a control flow in the electrostatic actuator.
Figure 9:
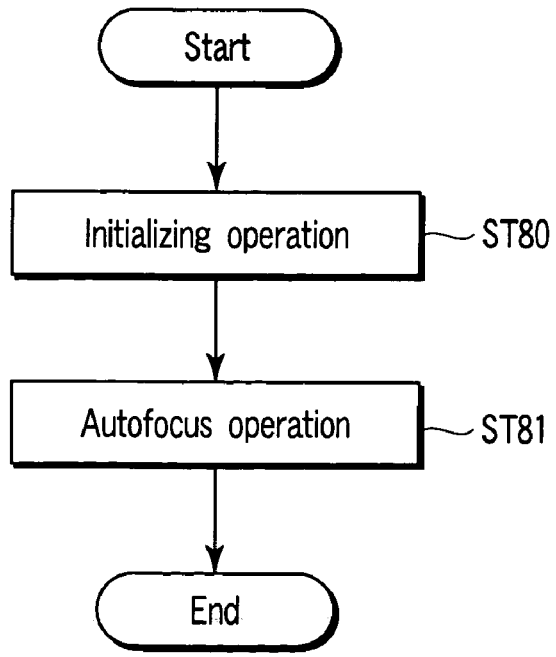
FIG. 9 shows an example of a control flow in the electrostatic actuator.

FIGS. 8 and 9 show the control flow in a second operation example. The control flow shown in FIGS. 8 and 9 is used in an inspection process before shipping. As shown in FIG. 8, the control program is transmitted from the external memory 410 to the actuator control unit 330 (ST70), and the control program is stored in the RAM 334. The control of the actuator 310 is started, and then the control of the actuator 310 is ended after a predetermined time has elapsed.

As shown in FIG. 9, the initializing operation is performed (ST80), the predetermining autofocus operation is performed (ST81), and the control flow is ended.

As described above, in accordance with the electrostatic actuator 300 of the second embodiment, since the control program for determining the operation algorithm of the actuator 310 can be fetched from the outside of the actuator control unit 330, the operation algorithm can be flexibly changed while a general purpose actuator control unit can be used as the actuator control unit 330. Therefore, the electrostatic actuator and the portable electronic devices such as the cellular phone and the digital camera into which the electrostatic actuator is incorporated can be manufactured at low cost.

Figure 10:
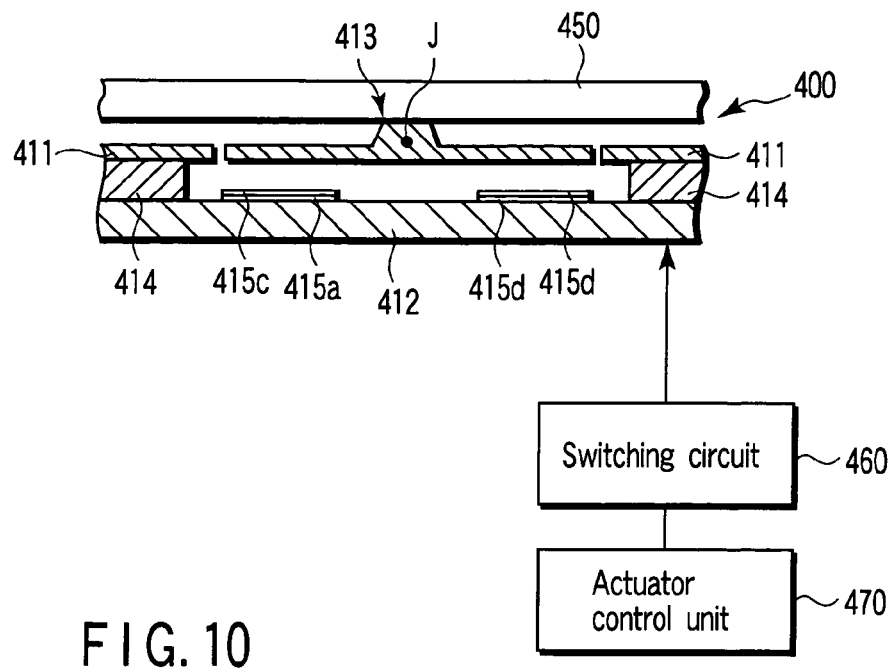
FIG. 10 shows a schematic configuration of an electrostatic plane actuator according to a third embodiment of the invention.
Figure 11:
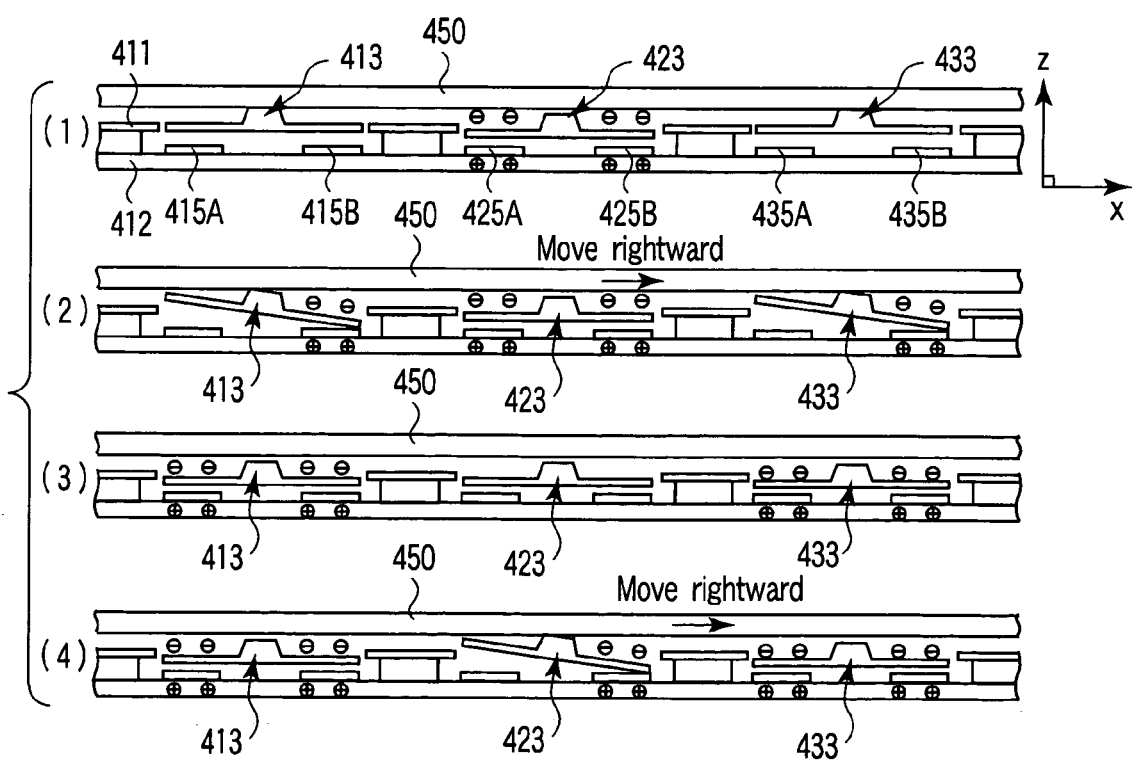
FIG. 11 is an explanatory view showing an operation principle of the electrostatic plane actuator.
Figure 12:
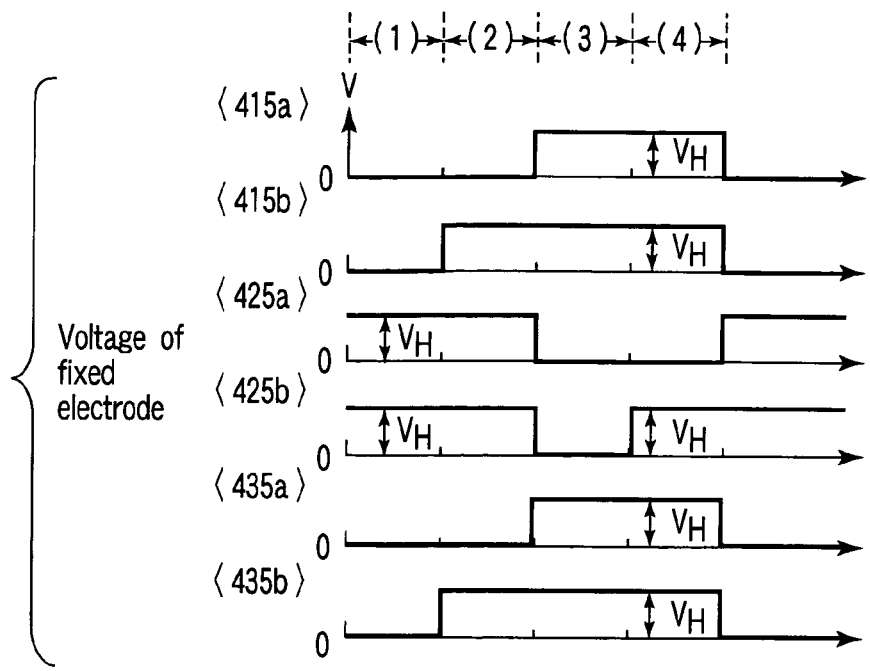
FIG. 12 is an explanatory view showing voltage application timing of the electrostatic plane actuator.

FIG. 10 shows a schematic configuration of an electrostatic plane actuator 400 according to a third embodiment of the invention, FIG. 11 is an explanatory view showing an operation principle of the electrostatic plane actuator 400, and FIG. 12 is an explanatory view showing voltage application timing of the electrostatic plane actuator 400.

The electrostatic plane actuator 400 includes a stator 410, a parallel moving plate 450 which becomes a moving body, a switching circuit 460 which applies the voltage to electrode substrates 415a, 415b, 425a, 425b, 435a and 435b, and an actuator control unit 470 which controls the switching circuit 460.

The stator 410 includes an upper surface plate 411 made of metal and a bottom surface plate 412 made of ceramic or the like. The upper surface plate 411 and the bottom surface plate 412 are thin flat plates, and the upper surface plate 411 and the bottom surface plate 412 are located in parallel with each other while being separated from each other with a predetermined interval. A plurality of support posts 414 for fixing the upper surface plate 411 and the bottom surface plate 412 is provided between the upper surface plate 411 and the bottom surface plate 412. A plurality of rocking elements 413, 423 and 433 is formed in the upper surface plate 411. In the rocking elements 413, 423 and 433, two electrodes are supported by a hinge. The rocking elements 413, 423 and 433 are rocked about a rocking axis in the direction perpendicular to the paper plane.

In the rocking elements 413, 423 and 433, when the specific voltage pattern is applied to the fixed electrode, electric potential difference is generated between the fixed electrode and the rocking elements 413, 423, or 433. At this point, one of the electrodes of the rocking elements 413, 423, or 433 is attracted to the fixed electrode, and the other electrode of the rocking elements 413, 423, or 433 comes into contact with the parallel moving plate 450. This allows friction force to be generated to move the parallel moving plate 450.

Since the switching circuit 460 is formed in the same way as the switching circuit 60 or the switching circuit 320 and the actuator control unit 470 is formed in the same way as the actuator control unit 100 or the actuator control unit 330, the detail description will be neglected.

In the electrostatic plane actuator 400 having the above-described configuration, the drive is performed as below. When the actuator control unit 470 outputs the waveform pattern in which voltage Vh is a TTL level, the voltage is converted into Vh by the switching circuit 460 and inputted to the electrode substrates 415a, 415b, 425a, 425b, 435a and 435b.

As shown in FIG. 12, when the specific voltage pattern is sequentially applied, the rocking elements 413, 423 and 433 come into contact with the parallel moving plate 450, which generates the friction force to move the parallel moving plate 450.

As described above, in accordance with the electrostatic actuator 400 of the third embodiment, when the actuator control unit 470 having the same configuration as the actuator control unit 100 of the first embodiment is used for the electrostatic plane actuator 400, it is possible to obtain the same effect as the electrostatic actuator 1 of the first embodiment. Namely, the desired algorithm can be selected by incorporating the plurality of operation modules into one chip and determining which module is enabled in accordance with the lens configuration of the actuator and the like. This enables the control compatible with the plurality of types of the electrostatic actuators to be performed only by manufacturing one type of the chip. Therefore, the production cost of one chip can be decreased, and the electrostatic plane actuator and the portable electronic devices such as the cellular phone and the digital camera into which the electrostatic plane actuator is incorporated can be manufactured at low cost.

When the actuator control unit 470 having the same configuration as the actuator control unit 330 is used for the electrostatic plane actuator 400, it is possible to obtain the same effect as the electrostatic actuator 200 of the second embodiment. Namely, since the control program for determining the operation algorithm of the actuator can be fetched from the outside of the actuator control unit 470, the operation algorithm can be flexibly changed while a general purpose actuator control unit can be used as the actuator control unit 470. Therefore, the electrostatic actuator and the portable electronic devices such as the cellular phone and the digital camera into which the electrostatic actuator is incorporated can be manufactured at low cost.

Figure 13:
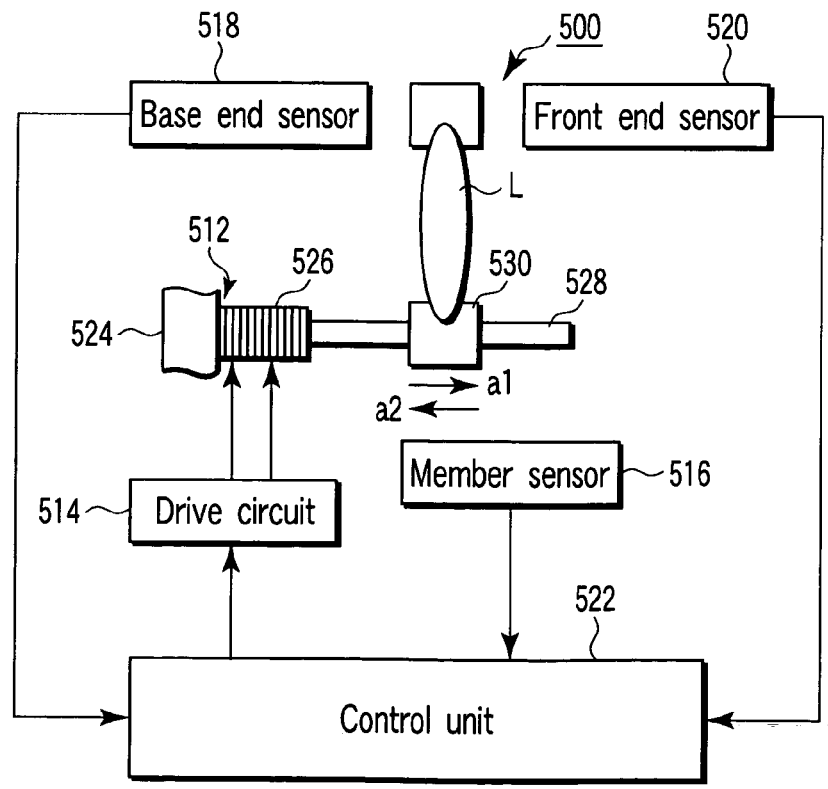
FIG. 13 shows a schematic configuration of a piezoelectric actuator according to a fourth embodiment of the invention.

FIG. 13 is a block diagram schematically showing the basic configuration of an impact type piezoelectric actuator (electromechanical transducer) 500 according to a fourth embodiment of the invention. The piezoelectric actuator 500 includes a drive unit 512, a drive circuit 514 which drives the drive unit 512, a member sensor 516 which detects a position of an engaging member 530 attached to the drive unit 512, a base end sensor 518 provided at a base end of the drive unit 512, a front end sensor 520 provided at a front end of the drive unit 512, and a control unit 522 which controls the overall operation.

The drive unit 512 has an element fixed type structure. The drive unit 512 includes a support member 524, an electromechanical transducer 526, a drive member 528, and the engaging member 530. The support member 524 supports the electromechanical transducer 526 and the drive member 528. The electromechanical transducer 526 is formed by laminating a plurality of piezoelectric substrates having a predetermined thickness while the electrode (not shown) is sandwiched between the piezoelectric substrates. A lens L which is of the driven subject is attached to the engaging member 530.

The control circuit 514 is formed in the same way as the switching circuit 60 and the control unit 522 is formed in the same way as the actuator control unit 100, so that the detail description will be neglected.

In the piezoelectric actuator 500 having the above-described configuration, when the waveform data shown in FIG. 14 is inputted from the control unit 522 to the drive circuit 514, the drive circuit 514 generates a voltage pattern necessary for the electromechanical transducer 526. The drive circuit 514 generates a sawtooth drive waveform shown in FIG. 15A or 15B to input the sawtooth drive waveform to the electromechanical transducer 526. When the drive voltage shown in FIG. 15A is applied to the electromechanical transducer 526, the engaging member 530 is intermittently moved toward the direction of an arrow a1 in FIG. 13. When the drive voltage shown in FIG. 15B is applied to the electromechanical transducer 526, the engaging member 530 is intermittently moved toward the direction of an arrow a2 in FIG. 13.

As described above, in accordance with the electrostatic actuator 500 of the fourth embodiment, when the control unit 522 having the same configuration as the actuator control unit 100 of the first embodiment is used for the electrostatic plane actuator 500, it is possible to obtain the same effect as the electrostatic actuator 1 of the first embodiment. Namely, the desired algorithm can be selected by incorporating the plurality of operation modules into one chip and determining which module is enabled in accordance with the lens configuration of the actuator and the like.

This enables the control compatible with the plurality of types of the electrostatic actuators to be performed only by manufacturing one type of the chip. Therefore, the production cost of one chip can be decreased, and the electrostatic plane actuator and the portable electronic devices such as the cellular phone and the digital camera into which the electrostatic plane actuator is incorporated can be manufactured at low cost.

When the control unit 522 having the same configuration as the actuator control unit 330 of the second embodiment is used for the electrostatic actuator 500, it is possible to obtain the same effect as the electrostatic actuator 300 of the second embodiment. Namely, since the control program for determining the operation algorithm of the actuator can be fetched from the outside of the control unit 522, the operation algorithm can be flexibly changed while a general purpose actuator control unit can be used as the control unit 522. Therefore, the electrostatic actuator and the portable electronic devices such as the cellular phone and the digital camera into which the electrostatic actuator is incorporated can be manufactured at low cost.

While the electrostatic actuator, the electrostatic plane actuator, and the piezoelectric actuator were used as the electromechanical transducer in the embodiments, the invention is not limited to the above-described actuators as long as the element which generates mechanical drive force by applying the voltage is used as the electromechanical transducer.

The invention is not limited to the above-described embodiments, and the modifications can be made by varying the constituent components of the invention in the implementation phase without departing from the spirit and scope of the invention. Further, various inventions can be made by properly combining the plurality of constituent components disclosed in the embodiments. For example, it is possible to eliminate some constituent components from the whole of constituent components shown in each of the embodiments. It is also possible to properly combine the constituent components in the different embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic actuator comprising:
    a stator having an electrode substrate;
    a movable unit having a plurality of movable elements and guided by the stator to be freely reciprocated in a predetermined direction;
    an electrode arranged opposite to the electrode substrate;
    a plurality of first operation modules each of which issues an operation command for realizing a zooming operation, the plurality of first operation modules including at least two first operation modules, one of which has an algorithm for driving the plurality of movable elements one by one, and the other of which has an algorithm for driving only one movable element;
    a plurality of second operation modules each of which issues an operation command for realizing a focusing operation;
    a module selector which selectively enables one first operation module of the first operation modules and selectively enables one second operation module of the second operation modules;
    an actuator drive module which generates a waveform signal on the basis of the operation command from the enabled first operation module and the operation command from the enabled second operation module; and
    a switching circuit which converts the waveform signal into a voltage to apply the voltage to the electrode substrate.

2. A method of driving an electrostatic actuator comprising a stator having an electrode substrate, a movable unit having a plurality of movable elements, guided by the stator to be freely reciprocated in a predetermined direction and an electrode arranged opposite to the electrode substrate, the method comprising:
    enabling selectively one first operation module of a plurality of first operation modules of the actuator for realizing a zooming operation, the plurality of first operation modules including at least two first operation modules, one of which has an algorithm for driving the plurality of movable elements one by one, and the other of which has an algorithm for driving only one movable element;
    enabling selectively one second operation module of the second operation modules of the actuator for realizing a focusing operation;
    generating a waveform signal on the basis of an operation command from the enabled first operation module and the enabled second operation module; and
    converting the waveform signal into a voltage to apply the voltage to the electrode substrate.

3. An electromechanical transducer in which mechanical drive force is generated by applying voltage, the electromechanical transducer comprising:
    a plurality of first operation modules each of which issues an operation command for realizing a zooming operation, the plurality of first operation modules including at least two first operation modules, one of which has an algorithm for driving a plurality of movable elements one by one, and the other of which has an algorithm for driving only one movable element;
    a plurality of second operation modules each of which issues an operation command for realizing a focusing operation;
    a module selector which selectively enables one first operation modules of the first operation modules and selectively enables one second operation modules of the second operation modules;
    an actuator drive module which generates a waveform signal on the basis of the operation command from the enabled first operation module and the enabled second operation module; and
    a switching circuit which converts the waveform signal into a voltage to apply the voltage to the electromechanical transducer.

4. A method of driving an electromechanical transducer in which mechanical drive force is generated by applying voltage, the method comprising:
    enabling selectively one first operation module of a plurality of first operation modules of the electromechanical transducer for realizing a zooming operation, the plurality of first operation modules including at least two first operation modules, one of which has an algorithm for driving a plurality of movable elements one by one, and the other of which has an algorithm for driving only one movable element;

enabling selectively one second operation modules of second operation modules of the electromechanical transducer for realizing a focusing operation;

generating a waveform signal on the basis of an operation command from the enabled first operation module and the enabled second operation module; and converting the waveform signal into a voltage to apply the voltage to the electromechanical transducer.

5. An electromechanical transducer in which electrostatic force is generated between a stator and a movable unit having a plurality of movable elements by applying voltage and thereby mechanical drive force is generated in the movable unit, the electromechanical transducer comprising:

a plurality of first operation modules each of which issues an operation command for realizing a zooming operation;

a plurality of second operation modules each of which issues an operation command for realizing a focusing operation;

a module selector which selectively enables one first operation module of the first operation modules and selectively enables one second operation module of the second operation modules, the plurality of first operation modules including at least two first operation modules, one of which has an algorithm for driving the plurality of movable elements one by one, and the other of which has an algorithm for driving only one movable element;

an actuator drive module which generates a waveform signal on the basis of the operation command from the enabled first operation module and the operation command from the enabled second operation module; and a switching circuit which converts the waveform signal into a voltage to output the voltage.

6. An electromechanical conversion method in which electrostatic force is generated between a stator and a movable unit having a plurality of movable elements by applying voltage and thereby mechanical drive force is generated in the movable unit, the method comprising:

enabling selectively one first operation module of the first operation modules for realizing a zooming operation and enabling selectively one second operation module of the second operation modules for realizing a focusing operation, the plurality of first operation modules including at least two first operation modules, one of which has an algorithm for driving the plurality of movable elements one by one, and the other of which has an algorithm for driving only one movable element;

generating a waveform signal on the basis of an operation command from the enabled first operation module and the enabled second operation module; and converting the waveform signal into a voltage to output the voltage.

* * * * *